US012775158B2

(12) United States Patent
Cuomo et al.

(10) Patent No.: US 12,775,158 B2
(45) Date of Patent: Oct. 27, 2026

(54) LOCKING EYECUPS

(71) Applicant: Sig Sauer, Inc., Newington, NH (US)

(72) Inventors: Anthony J. Cuomo, Wilsonville, OR (US); Joseph T. Fruechtel, Sherwood, OR (US); Wes R. Noble, McMinnville, OR (US)

(73) Assignee: SIG SAUER, INC., Newington, NH (US)

( * ) Notice: Subject to any disclaimer, the term of this patent is extended or adjusted under 35 U.S.C. 154(b) by 484 days.

(21) Appl. No.: 18/232,793

(22) Filed: Aug. 10, 2023

(65) Prior Publication Data

US 2024/0053597 A1 Feb. 15, 2024

Related U.S. Application Data

(60) Provisional application No. 63/396,733, filed on Aug. 10, 2022.

(51) Int. Cl.
*G02B 23/18* (2006.01)

(52) U.S. Cl.
CPC .................................... *G02B 23/18* (2013.01)

(58) Field of Classification Search
CPC ...................................................... G02B 23/18
See application file for complete search history.

(56) References Cited

U.S. PATENT DOCUMENTS 6,031,663 A * 2/2000 Funatsu .................. G02B 7/06 359/422
2010/0172026 A1* 7/2010 Steiner ................ G03B 11/046 359/600
2022/0356734 A1* 11/2022 Bullwinkel ......... E05B 65/0894

* cited by examiner

*Primary Examiner* — Thomas K Pham
*Assistant Examiner* — Jennifer A Jones
(74) *Attorney, Agent, or Firm* — Miller Nash LLP

(57) ABSTRACT

An adjustable eyecup for an optical device includes an eyecup slidably coupled with an eyepiece of the optical device, the eyecup having an outer portion and an inner portion and a retainer mechanism structured to restrict motion of the eyecup in a first direction when the locking mechanism is in a locked position.

20 Claims, 8 Drawing Sheets

100

100

LOCKING EYECUPS

CROSS-REFERENCE TO RELATED APPLICATIONS

This application claims benefit of U.S. Provisional Application No. 63/396,733, entitled LOCKING EYECUPS, filed Aug. 10, 2022, the disclosure of which is incorporated herein by reference in its entirety.

FIELD OF THE INVENTION

This disclosure is directed to optical devices, and, more particularly, to positionable eyecups for optical devices that may be locked in position after being adjusted.

BACKGROUND

Eyecups are primarily used in optical devices to facilitate bracing of the optic to the user's face/brow. This bracing allows for a steadier hold while viewing through the optic when additional support is not available. Additionally, eyecups may also shield the user's eye from stray light that would reduce perceived image quality. Adjusting the amount of protrusion of the eyecup to the rear of the eyepiece allows accommodation for variances in face geometry and variances in optical parameters, such as eye relief. Existing eyecups for optical devices, such as binoculars and spotting scopes, rotate on a helical ramp or cam surface to adjust their fore and aft position. The existing adjusting structures are limited to eyecups that are radially symmetric to remain functionally useable in multiple locations, as the eyecup must be comfortable to operate in all rotating positions. Also, the ramp system may lead to accidental or unintended movement, which may not even be noticed by the user. It is common that conventional eyecups inadvertently shift during normal use, which could affect performance of the optical system.

Embodiments according to the disclosure address these and other limitations of the known art.

DESCRIPTION

Figure 1B:
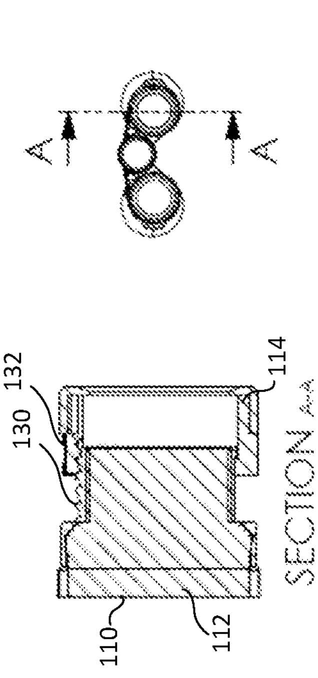
FIGS. 1A, 1B, and 1C illustrate positionable eyecups in an extended and locked position, according to a first embodiment of the disclosure.

Embodiments of the invention allow an eyecup for an optical device to be positioned fore and aft relative to the rear of the eyepiece. The fore-aft movement is linear as the eyecup is adjusted. In binoculars, generally there are two eyecups, one for each individual lens system in the binoculars. As described above, sometimes an eyecup moves during operation, especially repeated operation, which causes the eyecup to move out of its adjusted position. Embodiments of the invention include a locking mechanism that allows the position of the eyecup to be locked in a fixed position. In some embodiments, the lock will secure the eyecup in a fully out position, fully in position, and at many intermediate points in-between. Furthermore, some embodiments include a one-way lock, which prevents movement of the eyecup in one direction while allowing adjustment of the eyecup in the opposite direction. For instance, some embodiments prevent the eyecup from moving toward the optical device, while still allowing the user to adjust the eyecup in the opposite direction, i.e., away from the optical device. In some embodiments the eyecup may be moved using manual force in one direction while the lock prevents manual positioning of the eyecup in the opposite direction As mentioned above, some embodiments of the invention include a one-way lock that prevents the user from moving the eyecup in one direction while allowing the user to move the eyecup in the opposite direction, even when the one-way lock is engaged. In this manner, even when locked, the eyecup may be moved aft, i.e., away from the eyepiece without needing to unlock the locking mechanism. To move the eyecup away from the eyepiece, the user merely applies rearward pressure (pulls), the eyecup away from the eyepiece. Pulling on the eyepiece overcomes the locking force of the locking mechanism in this direction, and the eyecup may be manually positioned without unlocking the lock.

Conversely, the locking mechanism prevents the eyecup from moving fore, i.e., toward the eyepiece, even when pressure is applied to the eyecup toward the eyepiece. Instead, to move the eyecup in the fore direction, the user must first release a lock. In some embodiments, releasing the lock may involve the user depressing a lever, pressing a tab, or rotating a structure, all of which are described below. In a full lock embodiment, unless the lock is released, the lock prevents movement of the eyecup in both the fore and aft directions. In a one-way lock embodiment, the lock prevents movement of the eyecup in a first direction while allowing movement in the opposite direction. For example, a user may adjust the eyecup in the aft direction without disengaging the lock but may be prevented from adjusting the eyecup in the fore direction without first releasing the locking mechanism. As such, in both the full and one-way embodiments, the locking mechanism may prevent any incidental movement of the eyecup in the fore direction, such as when the user puts pressure on the eyecup to use the optical device.

In this document the lock may be referred to as a ratchet structure, a retainer mechanism, or by other references. In general, one skilled in the art will understand that the lock is formed from a collection of components that prevent movement in one or both directions, depending on its structure, so long as the lock is engaged.

Figure 1C:
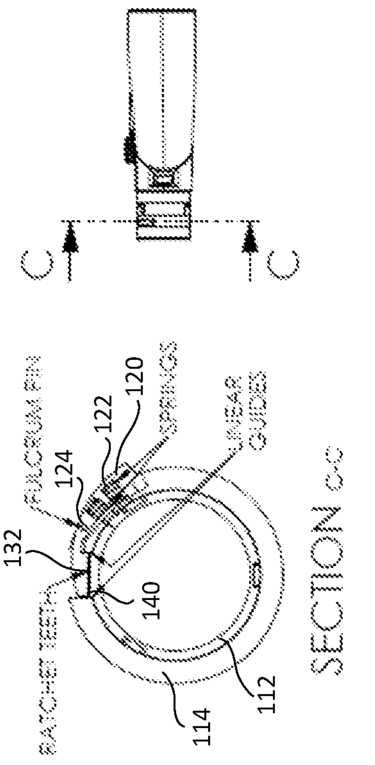
Figure 1A:
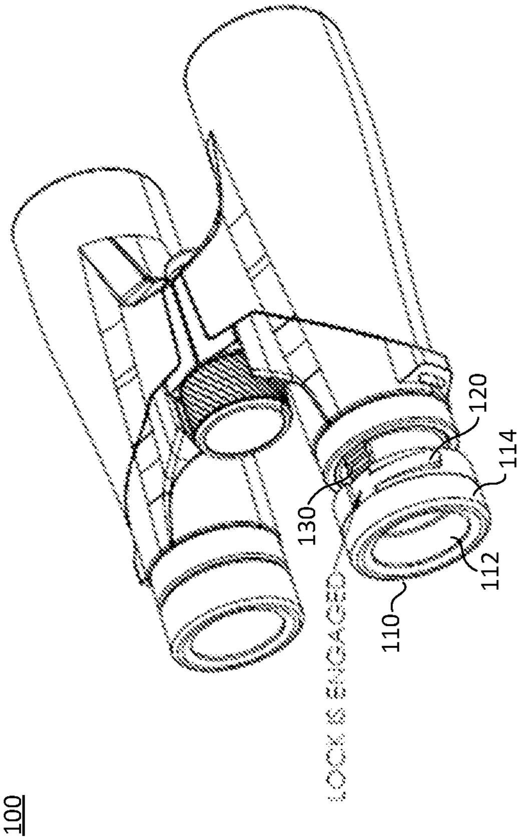
Figure 3B:
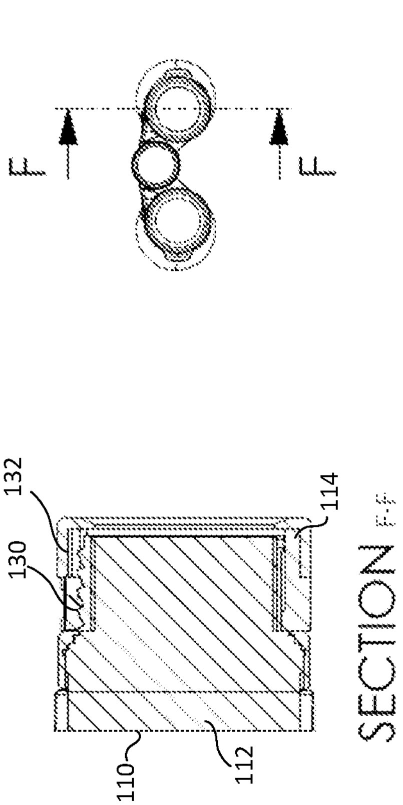
FIGS. 3A, 3B, and 3C illustrate positionable eyecups in a retracted and locked position, according to the first embodiment of the disclosure.
Figure 3C:
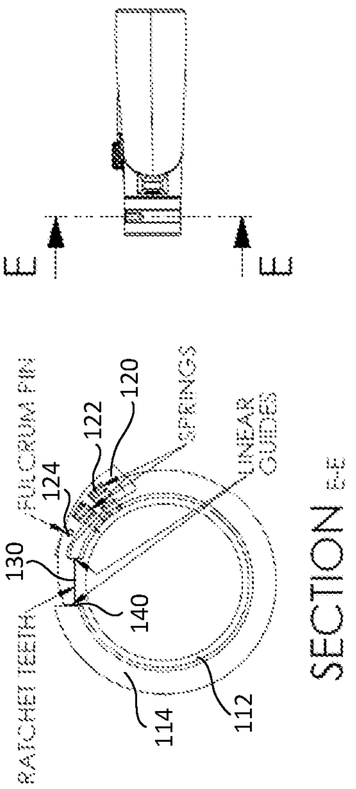
Figure 3A:
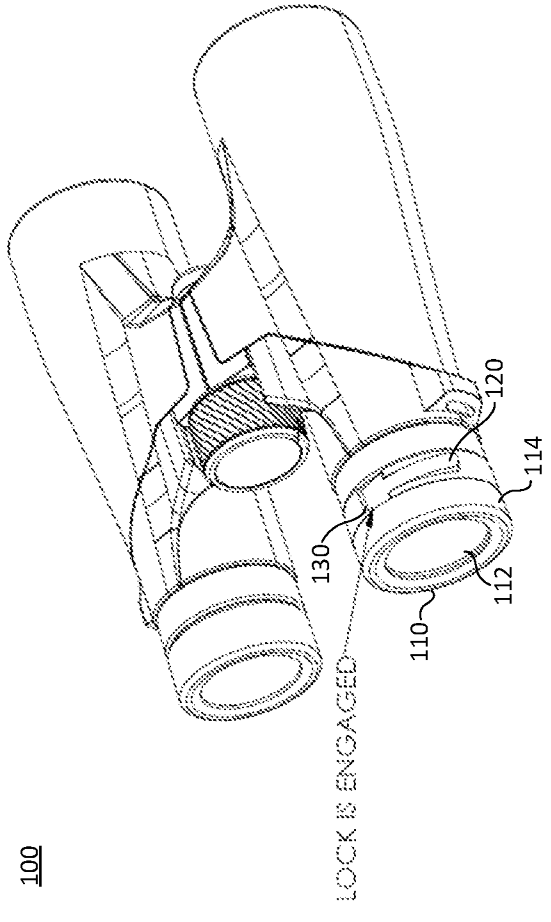

FIG. 1A shows a positionable eyecup 110 for an optical device 100. In FIG. 1A, the eyecup 110 is in an extended and locked position, according to embodiments of the disclosure. Extended in this context means that the eyecup 110 has been moved aft, or rearward, from a fully seated position, where the eyecup 110 is positioned as close as possible to a body of the optical device 100. This fully seated position of the eyecup 110 is illustrated in FIGS. 3A-3C. FIGS. 1B and 1C further illustrate cross-sectional views of the eyecup 110 when the eyecup 110 is in the position illustrated in FIG. 1A. As best seen in FIG. 3B, the eyecup 110 includes an outer portion 114 and an inner portion 112. The inner portion 112 includes a first ratchet structure 130, while the outer portion 114 is coupled to a releasable ratchet structure 132. As described in more detail below, with reference to FIGS. 4A-4C, the ratchet structures 130, 132 may cooperate to lock the outer portion 114 in its extended position from the inner portion 112. In one embodiment, as shown in FIG. 1C, the releasable ratchet structure 132 is coupled to a movable release lever 120, which is coupled to the eyecup 110 by a fulcrum pin 124. The release lever 120 may be biased in the locked position with one or more springs 122. In this locked position, the first and second ratchet structures 130, 132 mechanically engage one another to prevent the outer portion 114 to be moved in the fore direction, i.e., toward the inner portion 112, until the releasable ratchet structure 132 is released from its mechanical engagement with the ratchet structure 130. Such a release is performed by the user operating the release lever 120, such as by pressing down one end of the release lever. Further, the lock mechanism described herein may be a full lock, which prevents the outer portion 114 of the of the eyecup 110 from moving in either direction when the lock is set, or may be a one-way lock, which allows the outer portion 114 of the eyecup 110 to be moved in the aft direction without first releasing the lock. Whether the locking mechanism is a full lock or a one-way lock may depend on geometry of it components, which is described with reference to FIGS. 4A-4C.

In embodiments, the eyecup 110 may include linear guides 140 to ensure the movement of the outer portion 114 is substantially linear, and, in some embodiments, may prevent relative rotation between the outer portion 114 and the inner portion 112.

Figure 2B:
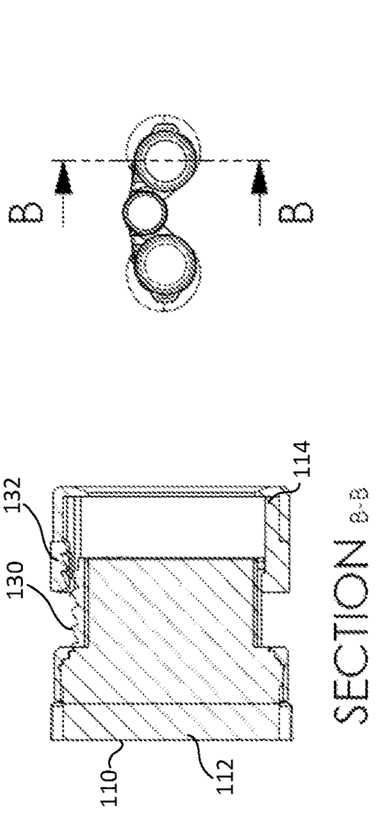
FIGS. 2A, 2B, and 2C illustrate positionable eyecups in an extended and unlocked position, according to the first embodiment of the disclosure.
Figure 2C:
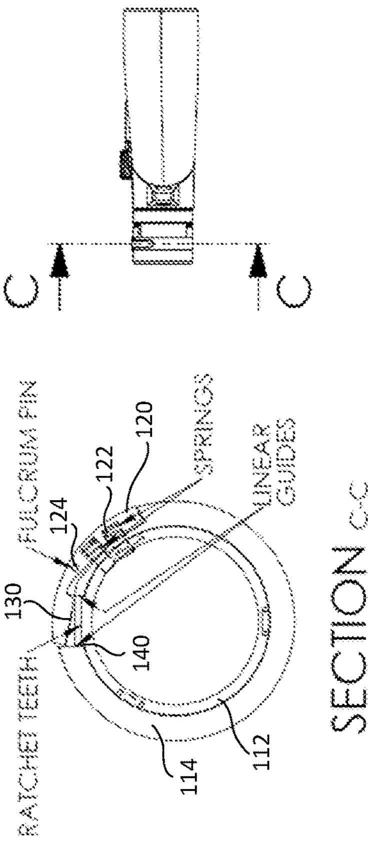
Figure 2A:
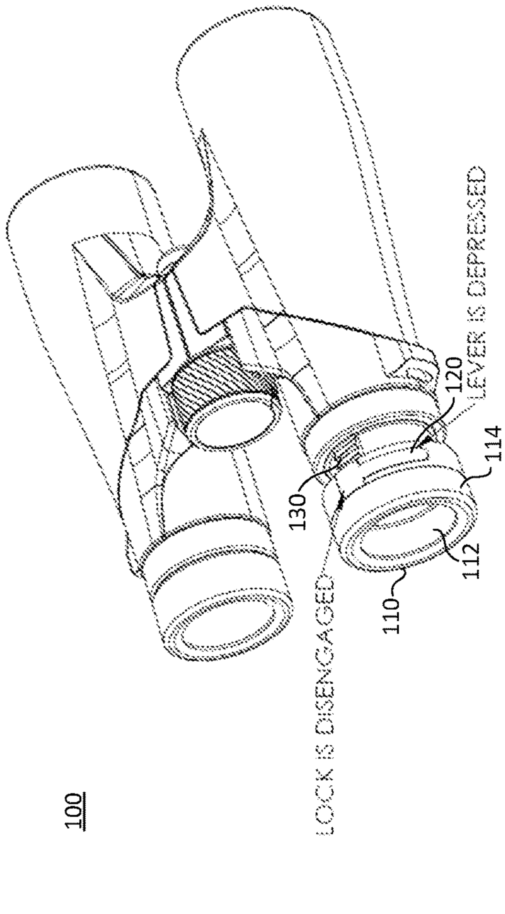

FIGS. 2A, 2B, and 2C illustrate the positionable eyecup 110 in an extended and unlocked position, according to embodiments of the disclosure. In this position, the user has pressed or otherwise operated the release lever 120, which, in turn, caused the releasable ratchet structure 132 to disengage from the first ratchet structure 130. This is best illustrated in FIG. 2B. With the releasable ratchet structure 132 in this disengaged position, the eyecup 110 may be moved in either the fore or aft directions, i.e., toward or away from the main body of the optical device 100 by pushing the outer portion 114 toward the eyepiece or pulling the outer portion 114 away from the eyepiece, respectively. The eyecup 110 may freely move in both directions when positioned by the user because, as illustrated in FIG. 2B, the teeth of the releasable ratchet structure 132 are disengaged from the teeth of the first ratchet structure 130. Thus, the outer portion 114 is free to slide along the inner portion 112 when manually moved by the user.

FIGS. 3A, 3B, and 3C illustrate the positionable eyecup 110 in a fully retracted and locked position, according to embodiments of the disclosure. As described above with reference to FIGS. 1A-1C, because the lock is in the locked position, the combination of the first ratchet structure 130 and the releasable ratchet structure 132, which in the locked position is physically intermeshed into the teeth of the first ratchet structure 130, the user is prevented from moving the eyecup 110 towards the main body of the optical device 100 without releasing lock. In the full lock embodiment, the user is also prevented from moving the eyecup in the aft direction. In the one-way lock embodiment, however, the lock structure allows the eyecup outer portion 114 to be moved away from the eyepiece by pulling on the outer portion 114. The differences between the full lock and one-way lock embodiments are described with reference to FIGS. 4A-4C.

Figure 4A:
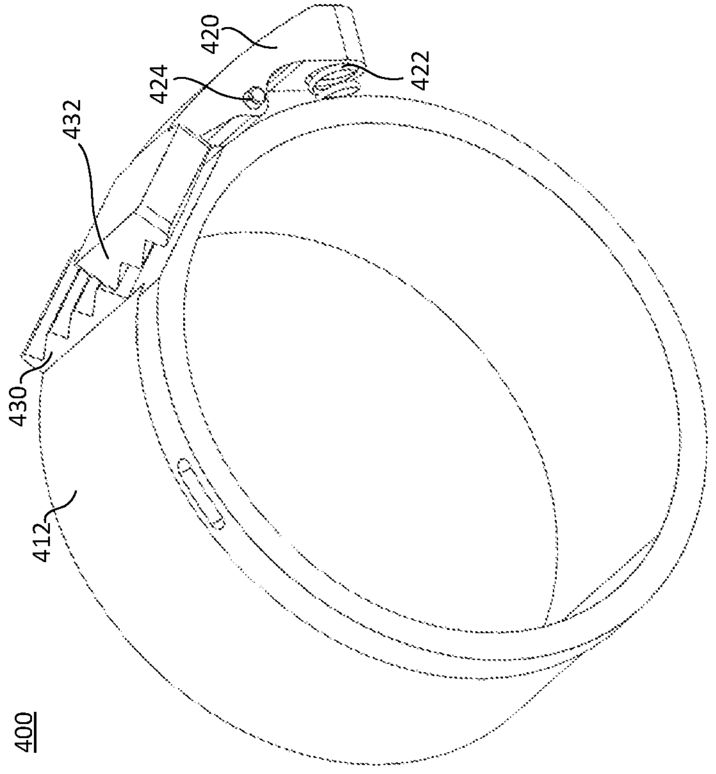
FIG. 4A illustrates a perspective view showing details of a locking mechanism for the eyecup illustrated in the previous figures, according to the first embodiment of the disclosure.
Figure 4B:
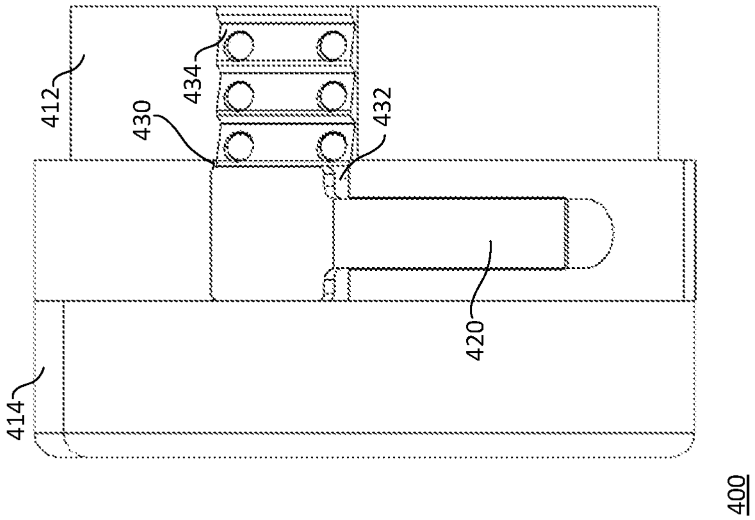
FIG. 4B illustrates a side view of the locking mechanism of FIG. 4A.

FIGS. 4A and 4B illustrate further details of the physical structure of an eyecup 400, according to an embodiment of the disclosure. The eyecup 400, according to this embodiment, includes an inner portion 412 that may remain static with respect to the optical device 100 (not illustrated) and an outer portion 414 (illustrated in FIG. 4B) that may be positionable along the inner portion 412, as discussed above. The main lock for the eyecup includes a first ratchet structure 430, which is attached to the inner portion 412. In this embodiment, the lock also includes a release lever 420 that may be caused by the user to rotate about a pin 424. When the release lever 420 is pressed, a releasable ratchet structure 432, which is attached to the release lever 420, physically moves away from and is separated from the first ratchet structure 430. In the unlocked position, there is no mechanical interference between the teeth of the first ratchet structure 430 and the releasable ratchet structure 432, the inner and outer portions 112, 114 of the eyecup 110 are free to move relative to one another, i.e., slide over one another to adjust the focus setting of the optical system to which the eyecup 110 is attached.

Conversely, in the locked position, illustrated in FIG. 4A, the lever 420 is biased by a spring 422 to cause the releasable ratchet structure 432 to engage the teeth of the first ratchet structure 430. The particular geometry of the teeth of the first ratchet structure 430 and the releasable ratchet structure 432 controls whether the lock is a full lock, which prevents movement of the eyecup in both the fore and aft direction, or is a one-way lock, which prevents movement of the eyecup in the fore direction, but allows the eyecup to be moved in the aft direction, even when the one-way lock is closed.

FIG. 4A illustrates the one-way lock embodiment. In particular, FIG. 4A illustrates teeth of the first ratchet structure 430 that are gently sloped in the aft direction, i.e., away from the optical device, but strongly sloped in the fore direction, i.e, toward the optical device. Further, the teeth of the releasable ratchet structure 432 are cooperatively sloped. When the teeth of the first ratchet structure 430 are engaged with the teeth of the releasable ratchet structure 432, such as when the release lever 420 is in its biased closed position, the intermeshed teeth prevent the eyecup from being moved toward the optical device without releasing the release lever 420. In this one-way lock embodiment illustrated in FIG. 4A, having a lower angle in the shape of the teeth of the first ratchet structure 430 and the releasable ratchet structure 432 allows the outer portion 414 to be pulled and slid along the inclines of the teeth and away from the eyepiece of the optical device, even when the lever 420 is in its biased closed position. This movement is possible without the need to depress the lever 420 due to the combination of the bias of the spring 422 being light enough and the angles of the teeth in the first ratchet structure 430 and the releasable ratchet structure 432 to one another. The bias of the spring 422 may continue to bias the lever 420 to cause the teeth of the releasable ratchet structure 432 to reengage with teeth of the first ratchet structure 430. Thus, when a user stops pulling the outer portion 414 away from the eyepiece, the outer portion 414 will once again sit in the locked position. Notably, though, the relationship of the teeth of the first ratchet structure 430 and the releasable ratchet structure 432 inhibits the outer portion 414 from being pushed toward the eyepiece until the user unlocks the lock by pressing the release lever 420.

The full lock embodiment may be made by modifying the teeth of the first ratchet structure 430 and/or the teeth of the releasable ratchet structure 432 so that the intermeshed teeth engage one another and prevent movement of the eyecup in both directions so long as the release lever 120 is in its closed position, i.e., so long as the lever 120 is not depressed.

Figure 4C:
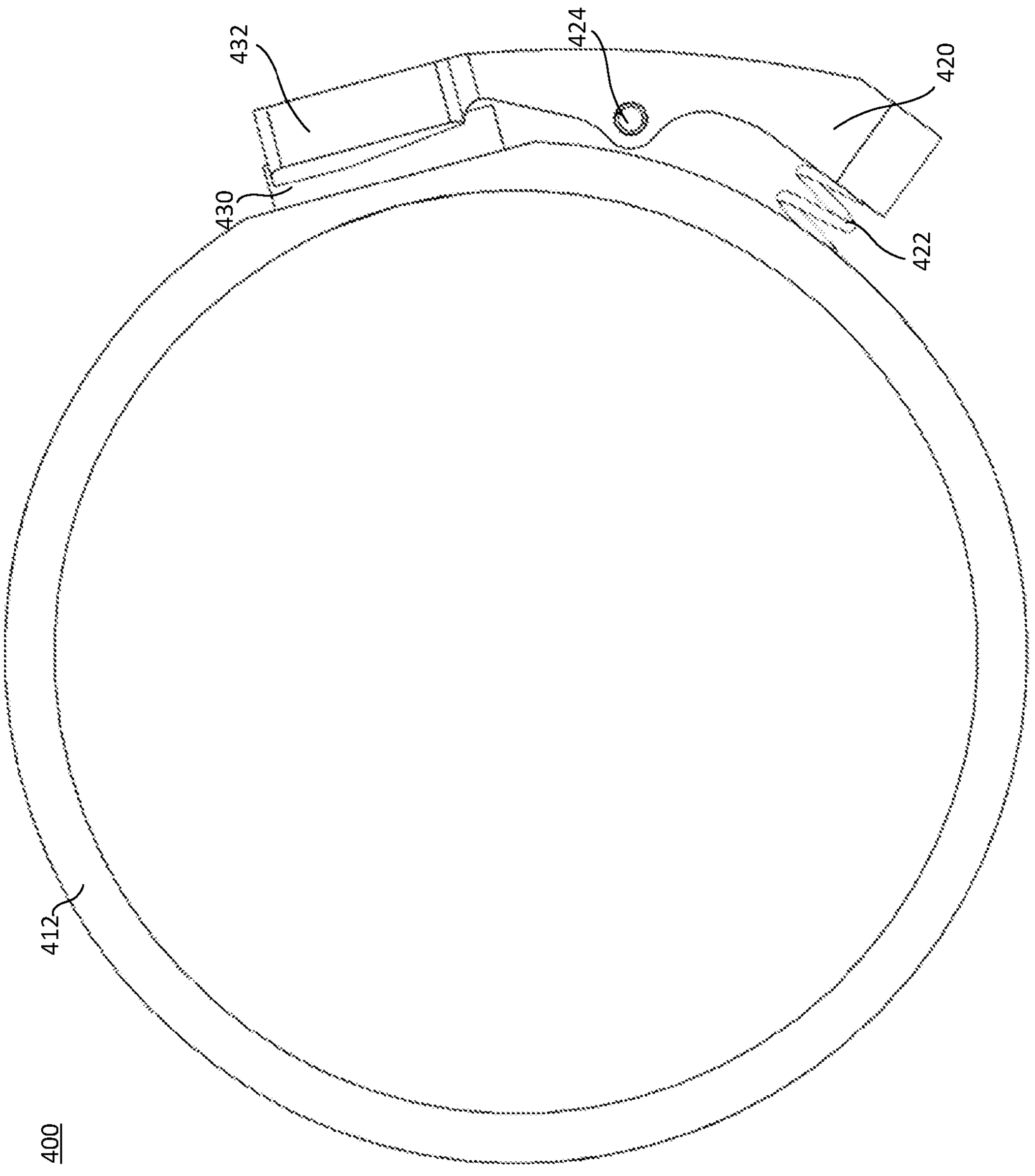
FIG. 4C illustrates a front view of the locking mechanism of FIG. 4A.

FIG. 4C is an end view of a portion of the eyecup 400 showing the eyecup in its locked position. To unlock the eyecup lock, the user depresses the lever 420. Depressing the lever 420 compresses the spring 422 and causes the lever 420 to rotate about the pin 424. Rotating the lever 420 physically disengages the releasable ratchet structure 432 from the first ratchet structure 430. While the lever 420 is depressed and the releasable ratchet structure 432 is lifted in this way, the outer portion 414 of the eyecup 400 may then be either manually positioned, such as by pushing or pulling it along the inner portion 412 without the relationship of the ratchet teeth inhibiting the motion. Once the lever 420 is released, the spring 422 re-biases the lever 420 back into a position in which the outer ratchet teeth 432 are reengaged with the inner ratchet teeth 434. In other words, releasing the lever 420 resets the eyecup 400 back in a locked position, and movement of the outer portion 414 toward the eyepiece will once again be prevented.

Figure 5B:
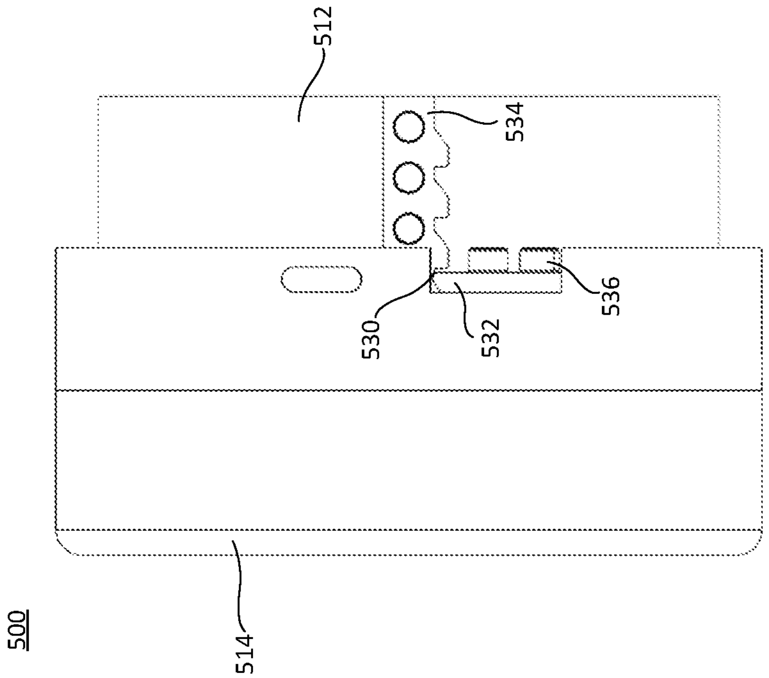
FIG. 5B illustrates a side view of the locking mechanism of FIG. 5A.
Figure 5A:
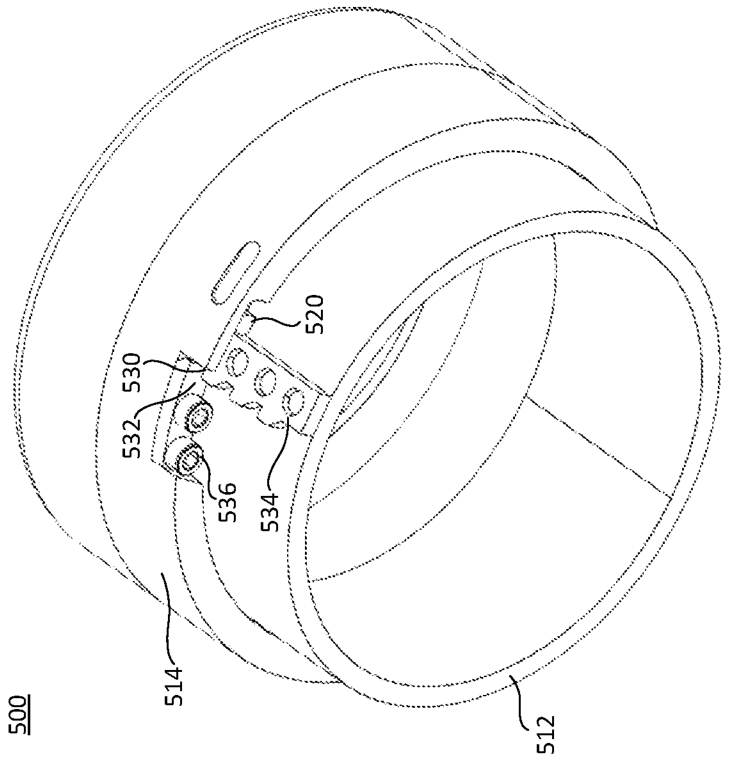
FIG. 5A illustrates a perspective view showing details of another locking mechanism for the eyecup, according to further embodiments of the disclosure.

Another embodiment of the disclosure may utilize rotation rather than the depressing of a lever to disengage the eyecup from its locked position. According to this embodiment, illustrated in FIGS. 5A and 5B, an eyecup 500 includes an inner portion 512 that may remain static with respect to the optical device (not illustrated) and an outer portion 514. Similar to the first embodiment described above, the outer portion 514 may be coupled with the inner portion 512 with a ratchet mechanism. Different from the embodiment described above with regard to FIGS. 4A-4C, however, the ratchet mechanism shown in FIGS. 5A and 5B may utilize a ratchet dog 532 secured to the outer portion 514 that is shaped to engage with ratchet teeth 534 of a ratchet rail 530. The ratchet dog 532 may be secured to the outer portion 514 via screws 536, but other suitable means for securing the ratchet dog 532 may be used. As best illustrated in FIG. 5B, the ratchet teeth 534 are disposed along the inner portion 512 in a direction substantially parallel to the linear path of the outer portion 514 when it is in motion, and only the side of the ratchet teeth 534 facing the ratchet dog 532 includes the tooth pattern. The ratchet dog 532 is positioned on the outer portion 514 such that it sits orthogonal to the ratchet teeth 534, and is structured to engage one of the teeth to maintain the position of the outer portion 512 to the inner portion 512.

Figure 5D:
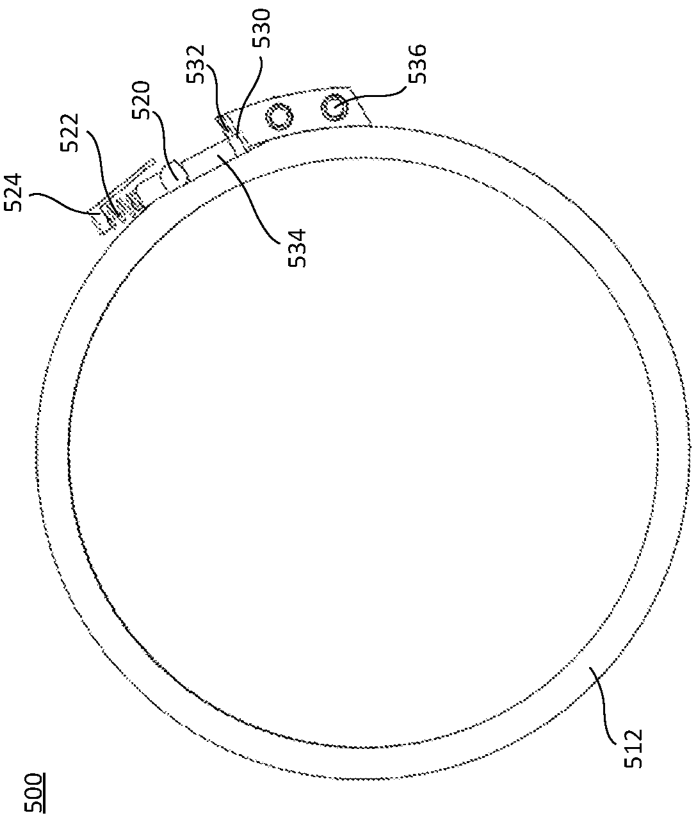
FIGS. 5C and 5D show additional details, in perspective and front views, of the locking mechanism of FIG. 5A.
Figure 5C:
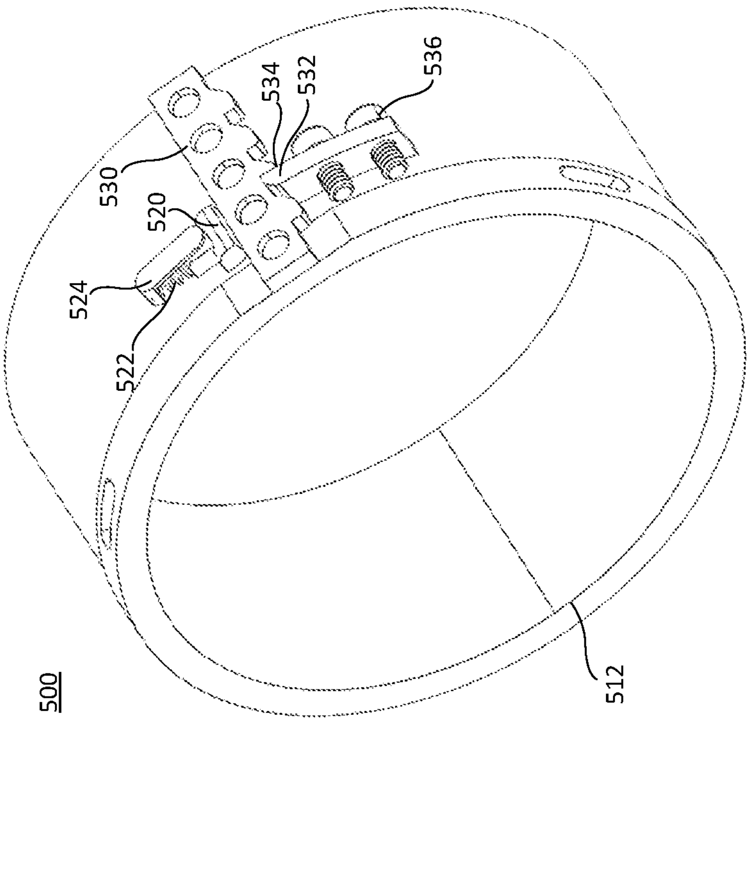

Further details of the ratchet mechanism are illustrated in FIGS. 5C and 5D. As shown, the ratchet mechanism includes a spring 522 to bias the ratchet dog 532 in an engaged position with the ratchet teeth 534. The spring 522 is coupled with the outer portion 514 at an anchor 524, which may itself be secured to the outer portion 514. Additionally, a stopper 520 may be secured to an end of the spring 522 interfacing with the non-toothed side of the ratchet rail 530. Accordingly, when the eyecup 500 is in its locked position, the extension force of the spring 522 biases the ratchet dog 532 in place within the ratchet teeth 534. Due to the shape of the ratchet teeth 534, however, the outer portion 514 may be pulled along the inner portion 512 away from the eyepiece. More specifically, pulling the outer portion 514 may cause the ratchet dog 532 to begin sliding along the inclined shape of the ratchet teeth 532, causing the spring to overcome its extension bias to compress and allow the ratchet dog 532 to continue sliding until the spring 522 biases the ratchet dog 532 back into engagement with the next tooth 534. In this way, once the user stops pulling the outer portion 514, the bias of the spring 522 will once again lock the eyecup 500. But, as discussed with regard to prior embodiments, the ratchet teeth 532 will inhibit any motion of the outer portion 514 toward the eyepiece without first unlocking the eyecup 500 from the locked position.

To modify the embodiment illustrated in FIGS. 5A-5D to a fully locking embodiment, the ratchet teeth 534 may be shaped to prevent movement in either direction so long as the ratchet dog 532 is engaged with the teeth. In other words, the ratchet teeth 534 would not include a ramped slope shape on one side, as illustrated in FIG. 5C, but rather the ratchet teeth 534 would include steep slopes, or perhaps even no slopes on both sides of the teeth 534.

To unlock the eyecup 500, the user may slightly rotate the outer portion 514 relative to the inner portion 512 to release the ratchet dog 532 from engagement with the ratchet teeth 534. As illustrated in FIGS. 5A-5D, this rotational direction may be clockwise when the user is looking through the eyecup 500 and the eyepiece. However, embodiments of the disclosure may be structured such that other rotational directions may allow disengagement of the ratchet mechanism. When a user rotates the outer portion 514, the anchor 524 moves toward the ratchet teeth 534. The spring 522 is thus compressed between the anchor 524 and the stopper 520. While the spring 522 is compressed, the shortened distance between the anchor 524 of the outer portion 514 and the ratchet teeth 534 gives the ratchet dog 532, which moves with the outer portion 514, sufficient clearance to disengage from the ratchet teeth 534. As such, while the outer portion 514 is rotated out of its ratcheted engagement with the inner portion 512, the outer portion 514 may freely move both toward the eyepiece and away from the eyepiece. Then, when the user releases the outer portion 514, the spring 522 extends and once again biases the ratchet dog 532 back into engagement with the ratchet teeth 532, locking the eyecup 500.

Figure 6B:
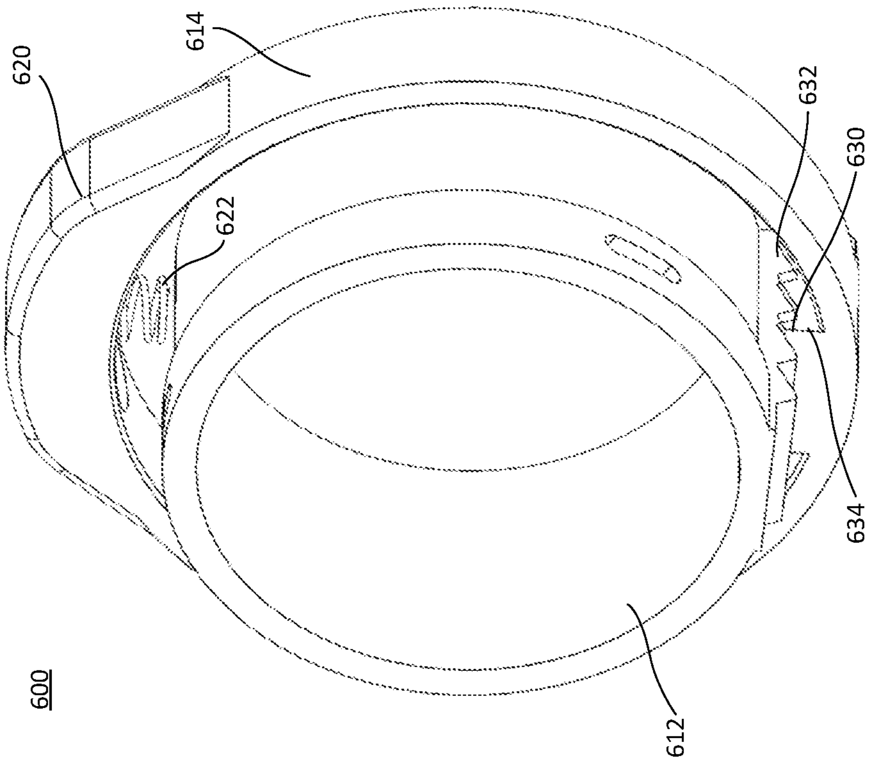
FIG. 6B shows the internal details of the locking mechanism for the locking eyecup of FIG. 6A.
Figure 6A:
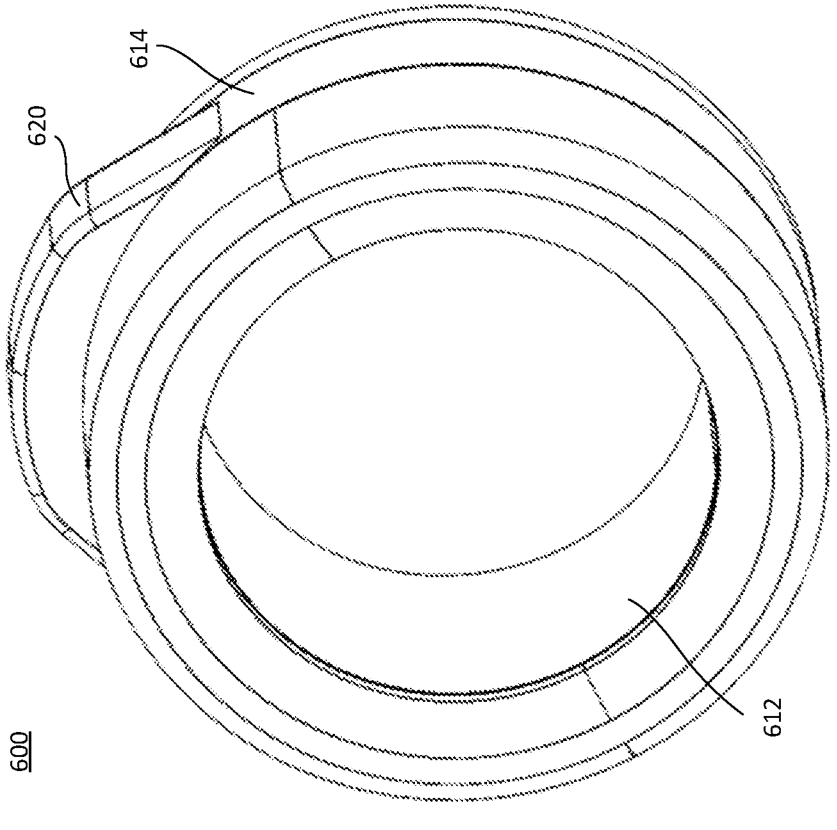
FIG. 6A illustrates a perspective view of a locking eyecup, according to further embodiments of the disclosure.

Further embodiments of the disclosure may utilize a button-like tab to unlock the eyecup from its locked position. For example, FIGS. 6A and 6B an illustrate an eyecup 600, still having an inner portion 612 and an outer portion 614, and further having a tab 620 on the outer portion 614 to disengage the outer portion 614 from its locked position on the inner portion 612. FIG. 6B shows internal details of such an eyecup 600. As shown, the outer portion 614 interfaces with the inner portion 612 with a spring 622 directly beneath the tab 620. Additionally, the eyecup 600 has a ratchet mechanism 630 opposite the spring 622, which comprises outer ratchet teeth 634 disposed on the outer portion 614 and inner ratchet teeth 632 disposed on the inner portion 612. When the eyecup 600 is at rest (i.e., no force is applied to the tab 620), the spring 622 biases the outer ratchet teeth 634 in an engaged position in the inner ratchet teeth 632. And, as discussed with respect to prior one-way lock embodiments, the shape of the outer ratchet teeth 634 and inner ratchet teeth 632 allow the outer portion 614 to be slid away from the eyepiece without applying to force to the tab 620, but will inhibit motion toward the eyepiece. Conversely, in full lock embodiments, the shape of the outer ratchet teeth 634 and inner ratchet teeth 632 are structured to prevent movement of the eyecup unless the tab 620 is first depressed.

When a user applies a force to the tab 620, however, the spring 622 compresses and causes the outer ratchet teeth 634 to disengage from their position in the inner ratchet teeth. While disengaged in this way, the user may then move the outer portion 614 toward or away from the eye piece without being restricted by the ratchet mechanism. When the user releases the force on the tab 620, the spring extends and once again biases the outer ratchet teeth 634 into engagement with the inner ratchet teeth 632, thus locking the eyecup 600.

As discussed, embodiments of the disclosure allow an eyecup for an optical device to be positioned with respect to the eyepiece, and locked into the set position. In so positioning the eyecup, in the one-way lock embodiments, the user may pull the eyecup away from the eyepiece regardless of whether the eyecup is locked or unlocked, but the user will be unable to move the eyecup toward the eyepiece without deliberately unlocking the eyecup. As such, the disclosed embodiments rest in a locked default position. Resting in the locked position in this way prevents any incidental movement of the eyecup while the optical device is in use. For instance, when a user presses their eye against the eye cup, the user naturally exerts a force on the eyecup that would otherwise cause the eyecup to tend toward the eyepiece. However, the disclosed locking mechanisms prevent this incidental motion of the eyecup and allow such motion only when the user actively unlocks the eyecup. Conversely, in the full lock embodiments, the lock prevents movement of the eyepiece while the lock is engaged, and allows movement of the eyepiece only when the full lock is disengaged. Further, although the above drawings illustrate only a single lockable eyecup in a binocular system, all of the eyecups in a multi-eyecup system may include the locks and operations as described above.

The previously described versions of the disclosed subject matter have many advantages that were either described or would be apparent to a person of ordinary skill. Even so, all of these advantages or features are not required in all versions of the disclosed apparatus, systems, or methods. All features disclosed in the specification, and all the steps in any method or process disclosed, may be combined in any combination, except combinations where at least some of such features and/or steps are mutually exclusive. Each feature disclosed can be replaced by alternative features serving the same, equivalent, or similar purpose, unless expressly stated otherwise.

Additionally, this written description makes reference to particular features. It is to be understood that the disclosure in this specification includes all possible combinations of those particular features. For example, where a particular feature is disclosed in the context of a particular aspect or embodiment, that feature can also be used, to the extent possible, in the context of other aspects and embodiments.

All features disclosed in the specification, including any claims, abstract, and drawings, and all the steps in any method or process disclosed, may be combined in any combination, except combinations where at least some of such features and/or steps are mutually exclusive. Each feature disclosed in the specification, including any claims, abstract, and drawings, can be replaced by alternative features serving the same, equivalent, or similar purpose, unless expressly stated otherwise.

The invention claimed is:

1. An adjustable eyecup for an optical device, comprising:
- an eyecup slidably coupled with an eyepiece of the optical device; and
- a locking mechanism structured to prevent sliding motion of the eyecup relative to the eyepiece in a first direction when the locking mechanism is in a locked position, the locking mechanism including a release member that is manually actuated to move the release member from the locked position to an unlocked position that disengages the locking mechanism to allow the eyecup to be slidably moved in the first direction relative to the eyepiece.

2. The adjustable eyecup according to claim 1 in which the locking mechanism is further structured to prevent motion of the eyecup in a second direction when the locking mechanism is in the locked position, the second direction being opposite the first direction.

3. The adjustable eyecup according to claim 1 in which the locking mechanism includes:
- one or more teeth disposed on the eyepiece of the optical device, and wherein the release member is carried on the eyecup and structured to engage one or more of the teeth when the locking mechanism is in the locked position.

4. The adjustable eyecup according to claim 3 in which the one or more teeth include an inclined shape.

5. The adjustable eyecup according to claim 3 in which the one or more teeth do not include an inclined shape.

6. The adjustable eyecup according to claim 1, in which the locking mechanism further includes a spring positioned to bias the release member toward the locked position.

7. The adjustable eyecup according to claim 1, in which the locking mechanism is a one-way lock that allows the eyecup to be slidably moved in a second direction opposite the first direction when the locking mechanism is in the locked position.

8. The adjustable eyecup according to claim 1, in which the locking mechanism includes a ratchet.

9. The adjustable eyecup according to claim 8, in which the release member includes a dog of the ratchet.

10. The adjustable eyecup according to claim 1, in which the release member is movable to the unlocked position by manually moving the release member in a direction different from the first direction.

11. The adjustable eyecup according to claim 1, in which the release member is manually depressible in a direction different from the first direction to move the release member to the unlocked position.

12. The adjustable eyecup according to claim 1, in which the release member is manually actuated by rotating the eyecup relative to the eyepiece.

13. An optical device comprising a set of binoculars having two eyepieces and two adjustable eyecups according to claim 1.

14. An optical device comprising:
- an eyepiece;
- an adjustable eyecup slidably attached to the eyepiece for adjusting a distance the eyecup protrudes from the eyepiece;
- a releasable locking mechanism including a release member that is manually movable from a locked position to an unlocked position, wherein:
  - in the locked position the release member engages the eyepiece to prevent movement of the eyecup in a first direction relative to the eyepiece, and in the unlocked position the locking mechanism is disengaged to allow the eyecup to be slidably moved in the first direction relative to the eyepiece.

15. The optical device of claim 14, in which the optical device is a set of binoculars including a second eyepiece, a second adjustable eyecup, and a second releasable locking mechanism.

16. The optical device of claim 14, wherein the locking mechanism is a one-way lock that allows the eyecup to be slidably moved in a second direction opposite the first direction when the release member is in the locked position.

17. The optical device of claim 14, in which the locking mechanism includes a ratchet.

18. The optical device of claim 14, wherein the release member is biased toward the locked position.

19. The optical device of claim 14, wherein the release member is moved to the unlocked position by manually moving the release member in a direction different from the first direction.

20. The optical device of claim 14, wherein the release member includes a dog that is manually moved to the unlocked position by rotating the eyecup relative to the eyepiece.

* * * * *